Feb. 28, 1961 C. W. HATCHER 2,973,076
COIN CONTROLLED APPARATUS
Filed Sept. 30, 1955 8 Sheets-Sheet 1

INVENTOR:
CREEL W. HATCHER
BY Howson & Howson
ATTYS.

Feb. 28, 1961 C. W. HATCHER 2,973,076
COIN CONTROLLED APPARATUS
Filed Sept. 30, 1955 8 Sheets-Sheet 2

Fig. 6.

INVENTOR:
CREEL W. HATCHER
BY Howson & Howson
ATTYS.

Feb. 28, 1961 C. W. HATCHER 2,973,076
COIN CONTROLLED APPARATUS
Filed Sept. 30, 1955 8 Sheets-Sheet 3

INVENTOR:
CREEL W. HATCHER
BY Howson & Howson
ATTYS.

Feb. 28, 1961  C. W. HATCHER  2,973,076
COIN CONTROLLED APPARATUS
Filed Sept. 30, 1955  8 Sheets-Sheet 4

INVENTOR:
CREEL W. HATCHER
BY Howson & Howson
ATTYS.

Feb. 28, 1961

C. W. HATCHER 2,973,076

COIN CONTROLLED APPARATUS

Filed Sept. 30, 1955

INVENTOR:
CREEL W. HATCHER
BY Howson & Howson
ATTYS.

United States Patent Office 2,973,076
Patented Feb. 28, 1961

2,973,076
COIN CONTROLLED APPARATUS
Creel W. Hatcher, Valley Forge, Pa.
(448 Conshohocken State Road, Gladwyne, Pa.)
Filed Sept. 30, 1955, Ser. No. 537,622
14 Claims. (Cl. 194—10)

This invention relates to coin handling apparatus conceived and adapted for the control and operation of vending machines and similar commercial operations. The basic objects of the invention have been to provide an apparatus and machine of improved construction and design for receiving and directing inserted coins, for controlling a vending operation performed by an associated machine, and for giving the correct amount of change as dictated by the sale price of the merchandise and the total amount of the coin or coins inserted into the machine.

A primary object and feature of the machine consists in the fact that it provides many features of advantage, both in the versatility of its performance and in the simplicity of its principle of operation, over coin-controlled apparatus heretofore available for commercial use with vending machines.

Another important object and feature has been to provide an apparatus which, by simple presetting of the sales price control, will control the vending and change-making within a wide price range, regardless of the sequence in which the coins are inserted.

Another object and feature has been to provide an apparatus which, in case one or more coins are inserted erroneously so that the total inserted exceeds the sale price, will return the excess amount inserted as change, while still completing the sale.

Another object and feature has been to provide the desired adjustment in the operation of the change-making mechanism through the mechanism which processes the coins inserted, upon adjustment of the sales price, without requiring any adjustment of the change making mechanism per se.

Another object and feature has been to provide an improved change-making mechanism which will give the desired amount of change for a wide variety of operations, by a single and uniform shuttle motion at the conclusion of the vending cycle, this motion being invariable except as to the position of certain control fingers which determine the amount of change to be given in response to the difference in value between the sales price to which the apparatus is set and the value of the coins inserted up to the time the vending is performed.

A very important object of the invention has been to provide an apparatus of this character in a compact form, and yet having great versatility in coin handling and change making. An important feature in achieving this end lies in the fact that a substantial part of the path of travel of the coins through the control apparatus is in an upward direction, so that the coins used in making change, after performing their control functions, may be deposited in the upper ends of coin barrels of unusual height and capacity, while still providing a compact apparatus of more or less standard dimensions.

A further object and feature has been to provide an apparatus in which the individual coins operate as elements in the mechanism and serve to actuate and control the apparatus through their direct mechanical effect in transmitting the desired actuating force. Through application of this principle, electrical components which have heretofore been a source of major maintenance problems have been almost completely eliminated, and substituted by straightforward mechanical actuating control.

Still further features and objects of the invention, and the manner in which they have been attained, will be evident from reading of the following detailed description in the light of the attached drawing, in which, Figure 14 is a detailed view of the rocker apparatus for actuating the change-making plates, Figure 15 is a detailed view of the rock shaft and arms associated especially with the nickel, dime and penny controlling operations.

The coin changing and control apparatus of the invention is desgined to be used in connection with a conventional coin selecting and slug rejecting apparatus 30 (Figure 6) and housed within a casing 31 which is hung vertically in a convenient position for insertion of coins by the purchaser, and connected to the associated and controlled vending machine in a manner familiar to those skilled in this art. After passing through the machine and performing their individual control functions, coins not required for change making pass to the left of the machine as illustrated, and through passageways 32 to the coin-collecting receptacle which is accessible only to the owner of the machine. Coins required for change making, on the other hand, are deposited in change-providing barrels or tubes, and are dispensed as required for that function, being deposited through openings 33 in a bottom plate 34 into a change box accessible to the purchaser.

The passageways for the individual coins through the apparatus are aligned with corresponding passageways in the coin selector. Thus, the penny-receiving and directing plate 35 (Figures 6 and 16), which actually comprises two plates in face-to-face spaced relation with intermediate spacers, has a penny-receiving and -directing slot 36 in alignment with the corresponding slot of the coin selector 30, and this slot directs the pennies through the apparatus in the performance of their control and actuating functions.

In a similar manner, plates 37, 38 and 39 (see especially Figure 16) receive and direct the nickels, dimes and quarters, respectively, through separate paths through the apparatus. Insofar as these general features are concerned, they are similar to related features of coin control apparatus of the prior art, and do not therefore require detailed description here.

It will facilitate description and understanding of the apparatus, and its operation, if we first describe aspects involved in a very simple transaction, such as the operation when a quarter is inserted and processed in the completion of a sale with the apparatus set in position to vend for this exact price.

Figure 1:
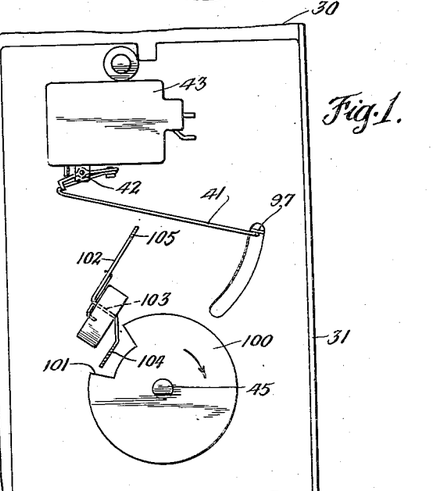
Figure 1 is a front elevational view of the apparatus of the invention, with the front plate, index disc and certain interior parts removed to reveal interior features.
Figures 13, 14, 15:
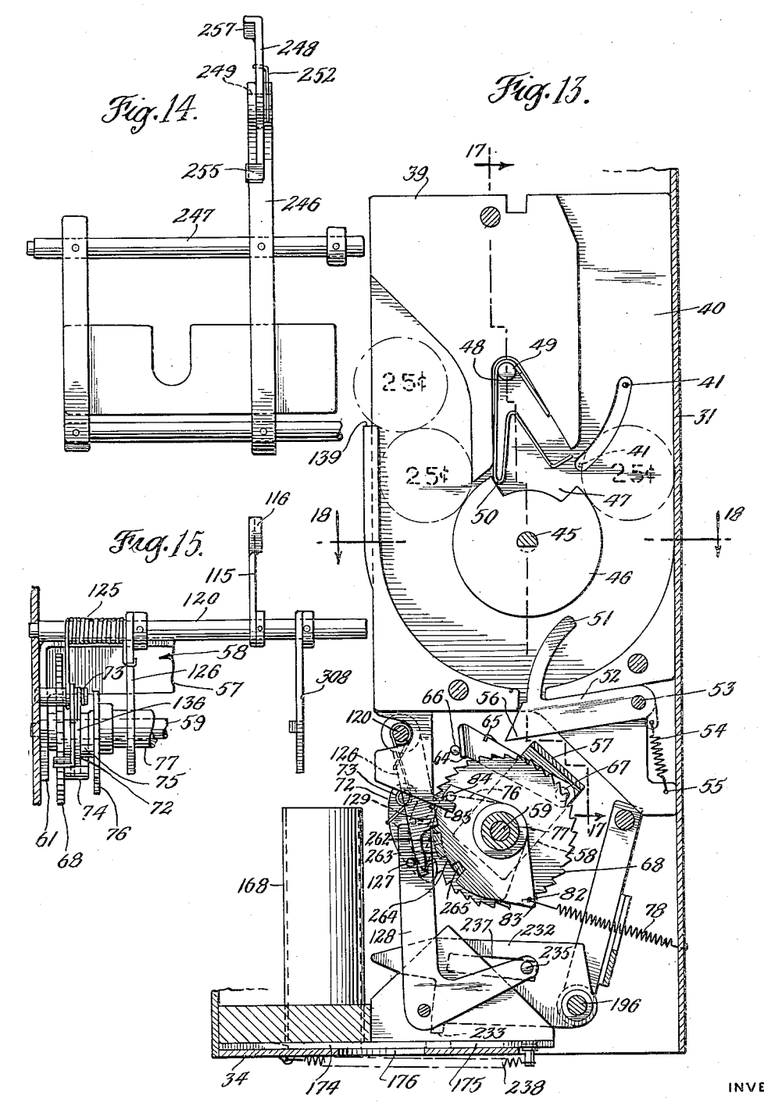
Figures 16, 17:
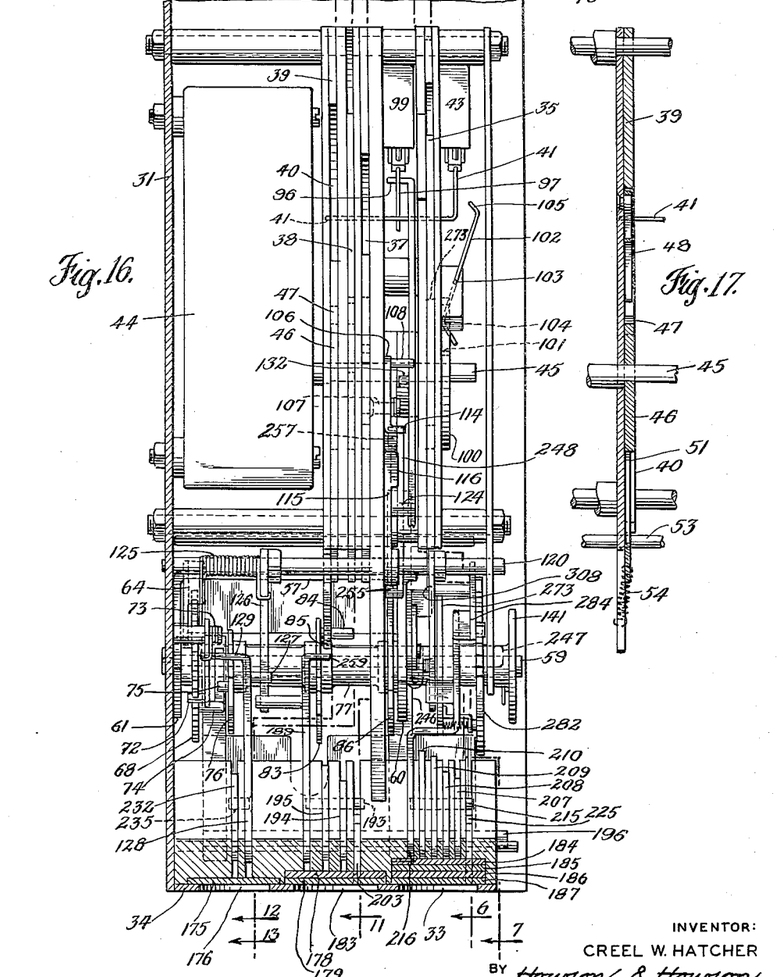
Figure 16 is a vertical crosss-ection through the apparatus, taken substantially on the line 16—16 of Figure 6.
Figure 17 is a vertical cross-section through the quarter plate, taken on the line 17—17 of Figure 13.
Figure 18:
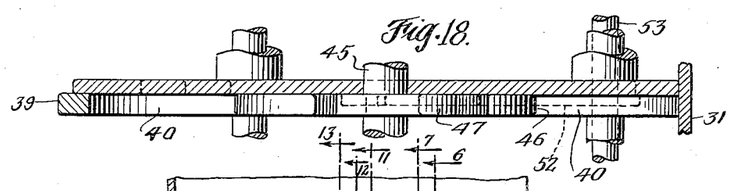
Figure 18 is an enlarged plan section on the line 18—18 of Figure 13.

By reference to Figures 1, 13 and 16, it will be seen that the quarter, deposited in the chute or slot of the coin selector overlying the present apparatus, and falling by gravity into slot 40 in quarter plate 39, first comes into contact with a wire switch actuator 41 which is pivoted at 42 to the housing of a motor control switch 43. In passing from the full line position to the dotted line position of Figure 13 under the weight of the quarter, the wire actuator 41 closes switch 43 and starts motor 44 (Figure 16), by which further coin-actuating and change making functions are performed.

Figure 6:
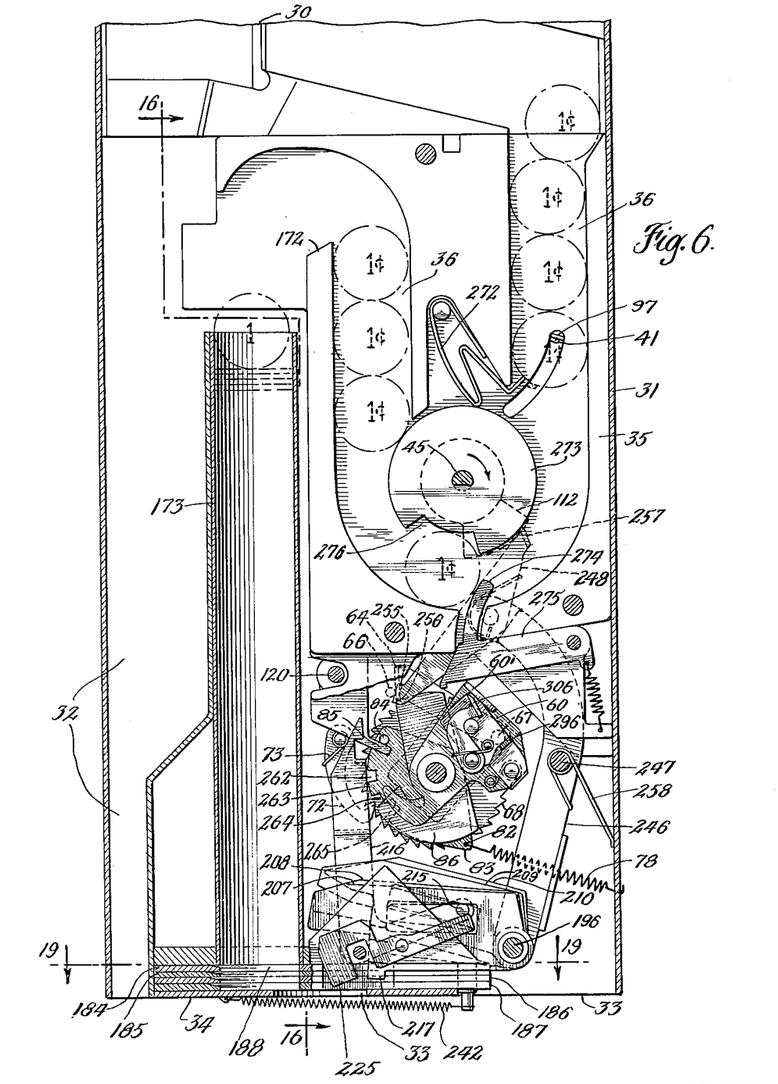
Figure 6 is a sectional front elevation taken substantially on the line 6—6 of Figure 16.

On the main drive shaft 45 of the motor 44, there is carried a quarter actuating disc or rotor 46 (Figure 13), and this disc is peripherally slotted as indicated at 47 through a portion of its circumference of sufficient length to receive and direct the quarter around a circumferential path in a manner similar to that illustrated in Figure 6 for control and actuation of a penny (see especially lowest penny illustrated in Figure 6). Thus, as the shaft 45 begins its clockwise rotation, the quarter enters slot 47 (Figure 13) and is thereafter controlled and impelled by the edges of that slot in its movement from the right hand position to the left hand positions of Figure 13.

As the rotor 46 begins to rotate, the rear edge of slot 47 strikes the bight 50 of a hair pin retaining wire 48 which is pivotally hung and confined by a pin 49 receiving its bent upper end and projecting between the opposed plates defining the opposite walls of the quarter slot 40. This causes the right hand, upwardly bent arm of the hair pin spring 48 to move counterclockwise into position to intercept other quarters which may be inserted and hold them in intercepted position until the rotor has substantially completed its full revolution, and the parts are again in position in which the bight 50 may drop into the non-intercepting position of Figure 13. For illustration of the corresponding intercepting function as applied in control of pennies, see Figure 6.

Figure 28:
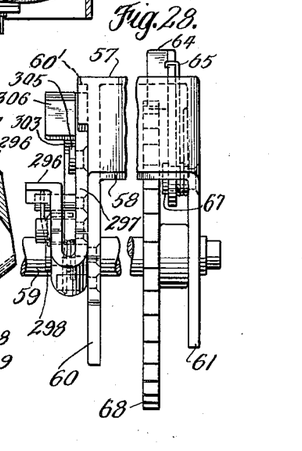
Figure 28 is a view at right angles to Figure 27, partly broken out.

As the quarter illustrated at the right of Figure 13 enters the slot 47 during clockwise rotation of rotor 46, it will be guided and impelled downwardly into contact with projecting arm 51 of lever 52, and this lever will accordingly be rotated counter-clockwise about its pivot 53 in opposition to the tension of spring 54, secured at 55, which normally holds the arm 51 in the projecting position of Figure 13. The lower edge 56 of lever 52 strikes the upper edge of actuating bar 57 under the impelling effect of the rotor-driven quarter, and this causes rotation of bar 57, which is the central bar of a U-shaped actuating lever 58 (Figure 28), in a clockwise direction about the mounting of its side arms 60 and 61 (Figures 16 and 28) upon shaft 59. The lever 58 is normally held in its counterclockwise limiting position by spring 62 (Figure 12) which is anchored at 63.

Figure 12:
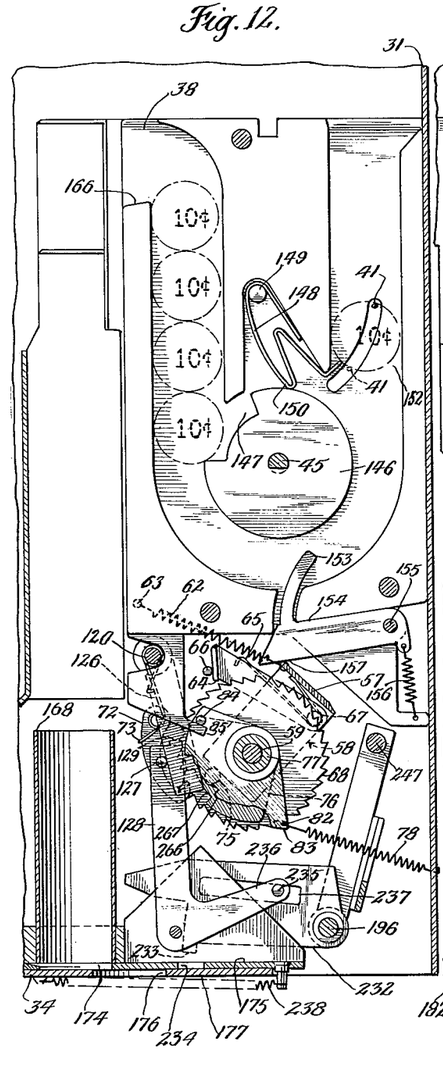

The actuating pawl 64 is carried by lever 58, and is urged by spring 65 for movement about its pivot pin 67 toward contact with its associated ratchet 68, which is mounted for rotation about shaft 59. A laterally projecting pin 66 serves as an abutment and stop for the counterclockwise movement of the pawl, and normally holds it out of contact with ratchet 68, as illustrated in Figures 12 and 13.

Figure 2:
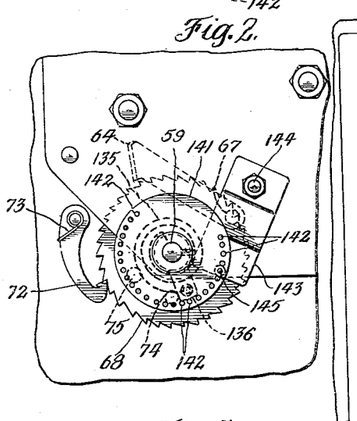
Figure 2 is a fragmentary front elevational view corresponding to a part of Figure 1, showing the front plate and index disc in their normal positions.
Figure 4:
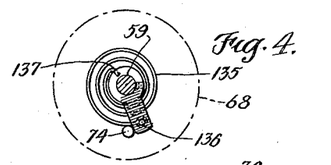
Figure 4 is a diagrammatic view of the spiral spring and associated parts controlled by adjustment of the index disc.

A holding pawl 72 is also associated with ratchet 68, and is urged into holding position by spring 73. A pin 74 projects laterally from the inner face of ratchet 68, as illustrated in Figures 2, 4 and 16, and this pin is positioned by preliminary adjustment of the ratchet 68 in setting the price as discussed hereinafter, so that it abuts an oppositely projecting pin 75 upon disc 76 just before completion of the ratchet movement produced by the quarter, the disc 76 being fixed for rotation with sleeve 77. Sleeve 77 is mounted for rotation upon shaft 59, and is normally retained resiliently in its extreme counterclockwise position as illustrated in Figure 2 by a spring 78 (Figures 11 and 12) which is secured at 82 to a disc 83 which is also secured for rotation with sleeve 77. Pin 84 is normally held by the tension of spring 78 in abutment with a lug 85, illustrated, but when pin 74 abuts pin 75, the yielding of spring 78 permits rotation of sleeve 77 carrying discs 76 and 83, under the impelling force imparted through ratchet 68 and pins 74 and 75.

Figure 7:
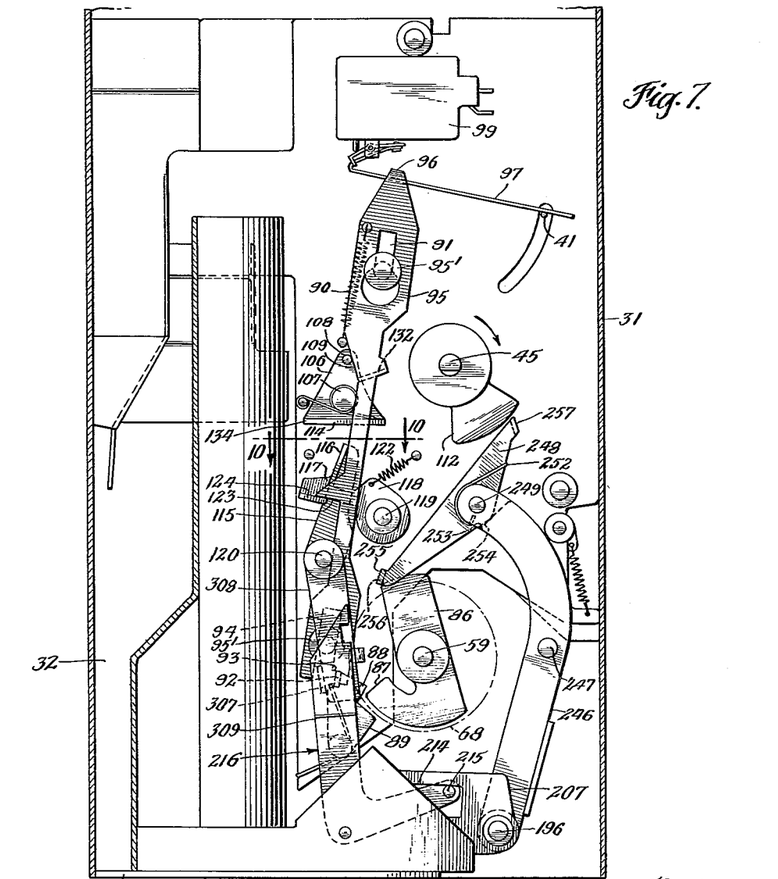
Figure 7 is a similar view taken on the line 7—7 of Figure 16, with certain parts omitted.
Figures 8, 9, 10:
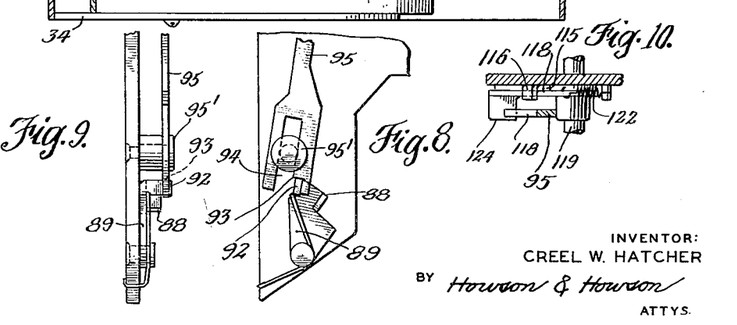
Figure 8 is a detailed view of the lower trip bar latch of Figure 7.
Figure 9 is a view of the parts illustrated in Figure 8, taken at right angles thereto.
Figure 10 is a sectional plan view on the line 10—10 of Figure 7, Figures 11, 12 and 13 are sectional front elevations, taken on the lines 11—11, 12—12 and 13—13, respectively, of Figure 16.

An L-shaped cam 86 (Figures 6 and 7) is also fixed for rotation with sleeve 77 and when this cam is moved in a clockwise direction by rotation of the sleeve, its forward face 87 abuts a lug 88 upon a latching arm 89 (see Figures 7–9 and 26). The arm 89 also carries a second lug 92 and is normally retained under spring pressure in position in which lug 92 is in latching engagement with a notch 93 at the lower end of a trip bar or lever 95. In Figures 7–9, these parts are shown in latched position, and in Figure 26 they are shown in the positions they occupy after the latch has been released by cam face 87 to permit the vending operation to take place.

Figure 26:
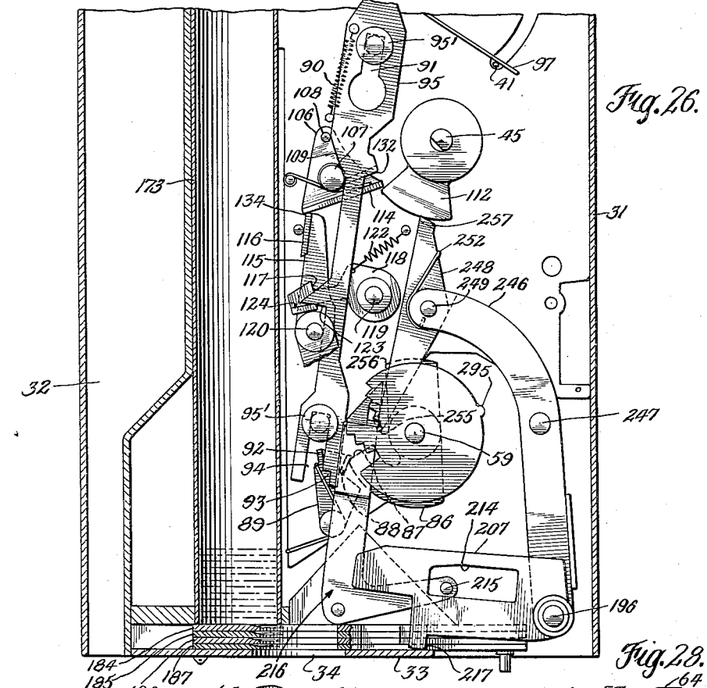
Figure 26 is a sectional elevation of the trip bar and related mechanism in released position and of the penny change-making shuttle plates in actuating position.

The trip lever 95 has a slot 94 (Figures 7 and 26) in its lower end, and when tab 92 swings out of notch 93 as illustrated in Figure 26, trip lever 95 will be pulled downwardly by spring 90, and guided in that movement by pins 95′ through slots 94 and 91 at its opposite ends. As the trip lever moves downwardly, a tab 96 (Figures 7 and 16) bent rearwardly from its upper end engages the actuating wire arm 97 of switch 99 to close the switch and energize the motor or solenoid (not shown) by which the vending machine is actuated.

The movement of arm 97 downwardly from the position illustrated in Figure 7 to the position of Figure 26 serves not only to energize the vending machine, but also to maintain closure of the switch 43 (Figure 1) of the circuit by which coin control motor 44 is energized, until the necessary movements have been completed for resetting of the machine, and for making change, when this is indicated by the value of the coins processed. This electric circuit control will now be explained.

As illustrated in Figures 1 and 16, a control disc 100 is mounted for rotation with the shaft 45 on the forward side of the penny plate 35, and the disc 100 is provided with a notch 101 of the same general type as notch 47 in disc 46, although for a different purpose. A spring latch 102 is mounted for rotation about axis 103 and has an angular follower surface 104 designed to be received within notch 101 when aligned therewith, and to be swung into position in which its end 105 overlies spring arm 41 as disc 100 rotates beyond the position of Figures 1 and 16 to a position in which the face of disc 100 abuts follower surface 104 to effect this movement.

By reference to Figure 13, it will be seen that the quarter at the right side, which closes switch 43 through wire actuator 41, will release actuator 41 as slot 47 receives the quarter and rotates with it beyond the range of the dotted line position of actuator 41 in that figure. By the time this rotation has occurred, however, disc 100 will have rotated to a position in which it holds spring latch 102 in the position in which its bent latching edge 105 (Figures 1 and 16) overlies arm 41, with the consequence that arm 41 will be held down and switch 43 closed and motor 44 energized until disc 100 rotates to the position in which notch 101 again underlies follower surface 104 and allows latch 102 to release arm 41. In cases in which the coin or coins inserted are insufficient to move ratchet 68 and latching arm 89 to actuating position with respect to trip lever 95, the circuit will be opened and shaft 45 stopped, when this condition occurs, until further coins are inserted to effect the sale. In the case under consideration, however, with a quarter inserted to consummate a sale set for a quarter, the actuating wire arm 97 of switch 99 will be drawn downwardly from the position of Figure 7 to the position in which it overlies the arm 41 as illustrated in Figure 26, and switch 43 will accordingly remain closed until follower surface 104 again clears notch 101 in rotation of disc 100, and switch 43 will then be held closed by latching of spring arm 41 by latch 102, through a second revolution of shaft 45. Thus, while switch arm 97 is maintained down just long enough to close switch 99 to perform the vending operation, this acts to produce a second revolution of shaft 45 by maintaining switch 43 closed through the period when it would otherwise be opened automatically, since latch 102 retains the circuit closed during the remainder of the second revolution.

A rocker latch 106 (Figures 7 and 26) is pivoted at 107 and carries toward its upper end a pin 108, and the rocker latch is spring biassed for clockwise rotation to cause the pin to maintain contact with a camming surface 109 at the rear of trip lever 95. A cam 112 (Figures 7 and 26) is secured for rotation with shaft 45, and as this cam rotates in the second revolution of shaft 45, it strikes a ledge 114 extending angularly from the lower edge of rocker latch 106, which ledge has been thrown into the path of rotation of cam 112 by the camming action of surface 109 in its downward movement, upon pin 108. The effects of this in control of the apparatus will appear hereinafter. Lever 115 carrying a laterally extending latch bar 116 is also released by the downward movement of lever 95, as this acts to release and force angularly downwardly the latching surface 117 from the position of Figure 7 to the position of Figure 26. The latching surface 117 is formed upon a latching lever 118 mounted upon a shaft 119 and urged in a clockwise direction by spring 122. Movement of latching lever 118 from the latching position of Figure 7 to the position of Figure 26 in which it releases bar 116 is achieved through ledge 123 on trip lever 95 which overlies laterally projecting tab 124 on lever 118 and drives it downwardly against the tension of spring 122 as lever 95 moves downwardly. As lever 115 is released in this manner, it rotates about shaft 120 to the position of Figure 26, through the operation of spring 125 (Figure 16), which rotates shaft 120 in the desired counterclockwise direction when so released.

A lever 136 (Figures 13 and 16) is also secured to shaft 120, and this lever is held in contact with a pin 127 (Figure 13) mounted upon an upstanding arm of bell-crank lever 128 by the force of gravity acting upon the lower arm of the bell-crank lever through shuttle apparatus hereinafter described, to cause clockwise movement of the bell-crank lever to preserve such contact. The upper end of the bell-crank lever carries a tab 129 which underlies holding pawl 72, and the apparatus operates to release the holding pawl and restore trip liver 95 to latched condition as follows.

As noted above, with the parts tripped into the position of Figure 26 and shaft 45 undergoing a second revolution, the leading surface of cam 112 will strike ledge 114 on rocker latch 106. Ledge 132 on lever 95 is struck and driven upwardly by ledge 114 and moves lever 95 to the upper position of Figure 7, in which it is again latched, as shaft 45 and cam 112 continue to rotate. The rotation of rocker latch 106 also causes the opposite end 134 of ledge 114 to rotate downwardly about axis 107 and drive latch bar 116 with shaft 120 in a clockwise direction beyond the ultimate latched position of Figure 7. Since tab 129 underlying holding pawl 72 partakes of this movement, the pawl will be released and the ratchet 68 will be allowed to return to its original position. As shaft 120 is returned in a counterclockwise direction to the position of Figure 7, the trip lever 95 will also have been returned to the position illustrated in that figure, as will also latching lever 118 and tab 92. The entire system will thus remain latched again until operated by completion of another sale. The completion of the second revolution of shaft 45 also brings slot 101 of control disc 100 (Figures 1 and 16) into registry with follower surface 104 of latch 102, permitting the spring release of this latch to the position of Figure 16, so that spring arm 41 is released and motor 44 stopped, until again energized by insertion of one or more additional coins.

As illustrated in Figure 4, a coil spring 135 is secured at one of its ends to an arm 136, and this arm 136 is in turn secured to shaft 59, which is stationary during normal operation of the apparatus, being rotated only for purposes of adjustment of the sales price between operations, as discussed hereinafter. The opposite end of coil spring 135 is secured to a collar 137 which is secured for rotation with ratchet 68. In the forward rotation of ratchet 68 to effect the sale, spring 135 is placed under tension, and when holding pawl 72 is released as discussed above, this tension causes ratchet 68 to rotate counterclockwise until pin 74 returns to its initial position against arm 136, as illustrated in Figure 4.

The release of ratchet 68 and its restoration with pin 74 to initial position also operates to release pin 75 carried upon disc 76 and sleeve 77, but this movement can restore pin 75 only to its initial position in which it is spaced from the pin 74 as illustrated in Figure 2, since pin 84, which is secured to disc 83 on sleeve 77, is limited in its counterclockwise rotation by abutment against the stationary lug 85 (Figures 6, 11, 12, 13 and 16).

As successive quarters pass through the apparatus to actuate ratchet 68 in performance of vending operations, they are carried upwardly and pass over ledge 139 into the cash box.

For the sake of straightforward description, we have omitted discussion of adjustment for various sale prices up to now and assumed that a given rotation of ratchet 68 will always bring pins 74 and 75 into abutment with each other to consummate the sale. As a matter of fact, this condition prevails only so long as the apparatus is set for a particular sale price and the apparatus for adjusting the price will now be discussed.

From the foregoing discussing, we have seen that the inactive position of pin 75 and disc 83 is always the same, as controlled by spring 78 (Figure 13) in holding pin 84 against lug 85. It is therefore necessary to adjust only the initial position of pin 74 with the attached ratchet 68 to adjust the amount of movement of the ratchet required to bring pins 74 and 75 into abutment to effect a sale. This in turn is accomplished by adjustment of the angular position of shaft 59.

Figure 3:
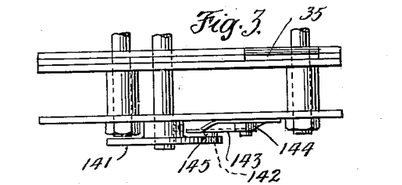
Figure 3 is a partial plan view showing the relation of the front plate and index disc to the plates defining the penny control slot.

A disc 141 (Figures 2 and 16) is secured to shaft 59 at its outer end, and this disc has a number of small holes 142 punched through it at equally spaced positions around an arc toward the outer edge of its face. A leaf spring 143 is anchored at 144 and has its free end biassed outwardly toward the inside face of disc 141, as illustrated in Figures 2 and 3. This free end carries a shouldered pin 145 which lies beneath the arc of rotation of the line of holes 142, and enters a selected hole when the free end of the leaf spring is released for outward movement.

In the embodiment illustrated, the hole which receives pin 145 in the extreme clockwise position of disc 141 will produce a sale for a nickel, unless other odd cent adjustments are made as discussed hereinafter. As the disc is rotated counterclockwise from this position to register successive holes upon pin 145, each successive hole adds five cents to the sale price. Thus, by reference to Figure 2 it will be seen that the adjustment to vend for a twenty-five cent sale price required that pin 145 be entered in the fifth hole downwardly from the upper right hand side.

Let us assume now that it is desired to adjust the sale price so as to vend for fifty cents. This may be accomplished by flexing the free end of spring 143 (see Figure 3) inwardly to release pin 145 from the fifth hole, and rotating the disc 141 counterclockwise until the tenth hole from the right registers with the pin. The spring 143 is then released to allow pin 145 to enter the tenth hole from the right instead of the fifth, and to lock shaft 59 in this position of adjustment. Since arm 136 is attached to shaft 59 and since spring 135 is under tension to cause pin 74 on ratchet 68 to follow disc 141, shaft 59 and arm 136 in this counterclockwise movement of adjustment, the distance between pins 74 and 75 prior to insertion of the first actuating coin will be doubled by this adjustment of the disc and of pin 74 from the fifth to the tenth hole. It will therefore require double the amount of movement of the ratchet 68 and double the amount or value of inserted coins to move ratchet 68 and pin 74 clockwise to the position in which pin 75 is moved clockwise to effect the sale and initiate the resetting and other operations. By the same token, if disc 141 is rotated counterclockwise around the twenty-six holes 142 to its extreme position of adjustment in which pin 145 enters the end hole 142 at the extreme upper left of Figure 2, the apparatus will require insertion of a dollar and thirty cents to move ratchet 68 and pin 74 through the larger arc now required to effect vending. Regardless of the position of initial adjustment of disc 141 with shaft 59, spring 135 will hold pin 74 against the forward edge of arm 136 until actuated by inserted coins, and will return the ratchet and pin 74 to this position upon release of holding pawl 72, after each sale is consummated.

Assuming now that the apparatus is adjusted to vend for fifty cents instead of twenty-five, by entry of pin 145 into the tenth hole 142, insertion of a quarter will cause the same initial operations to take place as discussed above, but the movement of ratchet 68 under the impelling force of arm 51 and pawl 64 will be sufficient only to move pin 74 half of the distance required to effect vending, and the energization of motor 44 and rotation of shaft 45 will be stopped after a single revolution of this shaft, since follower 104 will have entered slot 101 (Figure 1) to allow latch 102 to release wire actuator 41 to the inactive position of Figure 1. Holding pawl 72 will therefore merely hold ratchet 68 and pin 74 in their midway positions between inactive and actuating locations until a further coin is inserted, or if previously inserted is allowed to drop by retaining wire 48 and notch 47 (or their counterparts in the other coin plates) and rotates ratchet 68 and pin 74 through a further arc.

With the sales price set at fifty cents as discussed above, if the next coin to be inserted or released be a quarter, the consequent rotation of shaft 45 will cause arm 51 to actuate ratchet 68 and pin 74 through an arc of movement to abut pin 75 to cause the vending, resetting and other operations discussed above. Thus, the only difference lies in the fact that with the higher price sale settings of disc 141, more coins, or coins of higher value, are required for rotation of ratchet 68 through the arc necessary to start the vending, resetting, etc., sequence.

Let us assume now that, with the apparatus set to vend for fifty cents, two dimes and a nickel are inserted successively to complete the sale after the first quarter has been inserted and processed.

The dime plate 38 (Figure 12) includes a hair pin retaining wire 148 mounted on retaining pin 149 and having a bight 150 which normally enters a notch or slot 147 of the dime disc or rotor 146 to retain passageway 152 free of obstruction, these parts being similiar in construction and operation to the corresponding parts 48, 49, 50, 47 and 46, respectively, of the quarter slot. As illustrated in Figure 12, if two or more dimes are inserted in quick succession, or if a dime reaches the blocking position of retaining wire 148 during rotation of rotor 146, the later-received dimes will be held up until the previous rotation is completed and the dime is unblocked by entry of bight 150 into notch 147. However, if the rotor is stopped at the time the dime reaches this position, it will pass directly into position to be picked up by notch 147, as illustrated in connection with the quarter at the right of Figure 13. It should also be noted that the wire switch actuator 41 extends across the paths of the dime, nickel and penny slots, as well as the quarter slot, so that the deposit of any one of these coins will serve to close switch 43 and energize motor 44 through a single revolution.

As the rotor 146 is rotated through this revolution, the dime carried in its notch 147 strikes an arm 153 on an angular lever 154 which is pivoted at 155 and normally biassed in a clockwise direction by spring 156. The lower edge 157 of lever 154 strikes the upper edge of actuating bar 57 and rotates ratchet 68 through an arc corresponding to movement of lever 154 about its axis 155; i.e., through an arc determined by the projection of arm 153 into the path traversed by the dime under control of rotor 146. Since this is two-fifths of the amount of projection of arm 51 controlled by quarters impelled by disc 46, the resulting ratchet movement will be only through two-fifths of the remaining required arc. The ratchet 68 and pin 74 have now been rotated through seven-tenths of the arc required to effect vending, and are held in this position by holding pawl 72 pending deposit or processing of a further coin. If this coin be another dime, the steps discussed immediately above will be repeated to index ratchet 68 and pin 74 forwardly through a further fifth of their required arc of movement; i.e., to a position in which they register by their positioning the total of forty-five cents so far deposited and processed.

At this point, completion of the sale will be effected by deposit of a single nickel to complete the fifty cents required for purchase. The nickel rotor 158, notch 159, retaining wire 162, actuating arm 163, lever 164 and spring 165 are the same in construction and function as the corresponding parts of Figures 12 and 13 associated with the dime and quarter plates, and it is therefore unnecessary to describe them in detail, except to say that the arm 163 projects along the arc of rotation of rotor 158 only one-half as far as arm 153 in the dime arc and one-fifth as far as the arm 51 in the quarter arc. Each coin therefore produces a rotative movement to the ratchet 68 carrying pin 74 which is exactly proportionate to the value of the coin, and the last coin necessary to complete the sale carries pin 74 into position in which it operates through pin 75 to cause the vending and resetting operations to take place, exactly as in the case of the single quarter vending operation first discussed.

Dimes and nickels passing from their respective slots over ledges 166 and 167 are collected in their respective change barrels 168 and 169 (Figures 12 and 11) and pennies passing over ledge 172 (Figure 6) are similarly collected in penny change barrel 173. These coins may be used in change making as discussed hereinafter.

From the foregoing discussion it will be seen that the actuation in response to successive coins is cumulative, and that vending will be accomplished and the apparatus reset for a new sale when the total value of coins inserted equals or exceeds the value for which the apparatus is set to vend. It should be pointed out that the discussion has been somewhat oversimplified above in referring to the rotors 46, 146 and 158 as though a separate rotation of shaft 45 were required for processing of each individual coin. While it is obvious that only one coin of a given denomination can be moved through ratchet-actuating position in any one rotation of shaft 45, it is perfectly feasible to propel two or more coins simultaneously by their respective rotors in rotation of shaft 45 through a single revolution to register their values on ratchet 68. In order to make this feasible, the positions of the notches 47, 147 and 159 about their respective rotors are spaced angularly as illustrated in Figures 6, 11, 12 and 13, which show simultaneous positions of the coin-controlling rotors as driven by shaft 45. Thus, if a quarter, dime and nickel are carried around simultaneously by their respective rotors, the quarter will first operate against arm 51 to cause arm 57 to oscillate and index ratchet 68 through the desired arc. Arm 57 will have returned to inactive position by the time the dime strikes arm 153 to impart to the ratchet a further indexing movement, and still further indexing movements may be imparted by a nickel and/or penny, as these trail the quarter and dime in the rotation of shaft 45. The apparatus is responsive to insertion of any combination of quarters, dimes, nickels and pennies, and will perform its functions in response to insertion of these coins to the required value, regardless of the sale price and regardless of the order of insertion of the coins.

The apparatus discussed above for consumating the sale and resetting also serves to control the making of change, where the value of the coins inserted exceeds the sales price for which adjustment has been made. The change making is attained through shuttle mechanism operating in conjunction with the individual coin barrels 168, 169 and 173.

Figure 19:
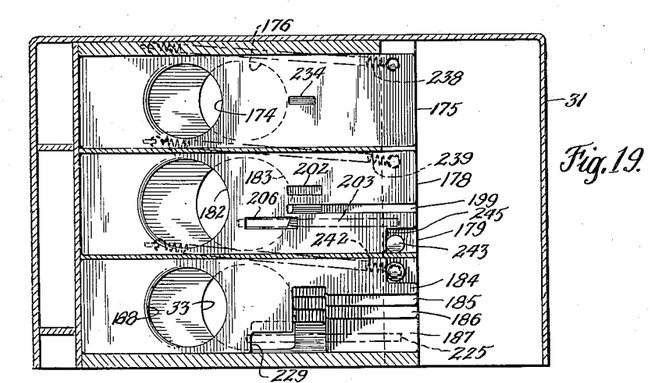
Figure 19 is a plan section taken on the line 19—19 of Figure 6, illustrating the general arrangement of the change-making shuttle plates and their housing.

Underlying the dime change barrel 168 (Figures 12, 13 and 19) is a hole 174 in a shuttle plate 175, this hole being positioned to receive the bottom-most dime in the barrel. When a dime is to be given in change, shuttle plate 175 is moved from the position of these figures laterally into a position in which hole 174 registers with a corresponding hole 176 in the bottom plate 34, which hole 176 communicates with the change box to deliver the dime in change to the customer.

In a similar manner, two superimposed shuttle plates 178 and 179 (Figures 11, 16, 19, 20 and 21) have holes underlying and registering with the nickel coin barrel 169. When the bottom-most only of these shuttle plates 179 is moved into position in which its hole 182 registers with hole 183 in bottom plate 34, one nickel will be given in change. When, on the other hand, both of plates 178 and 179 are moved into alignment with hole 183, two nickels will be given in change.

Four superimposed shuttle plates 184–7 (Figures 6, 16, 19 and 22–25) are used to make penny change. When the bottom-most plate 187 only is moved from the position in which its hole 188 registers with the penny change barrel 173 to the position in which it registers with hole 33 in plate 34, a single penny will be given in change. When plates 187, 186 and 185 are so moved, three pennies will be given in change. When all four are moved simultaneously, as illustrated in Figure 26, four pennies will be given in change. Thus, for any sale price set between one cent and one dollar and thirty cents, when the number of quarters and/or nickels and/or dimes and/or pennies is sufficient to exceed the sale price, the exactly required amount of change will be given. For example, with a sale price set at twenty-six cents, when two quarters are inserted, a dime, two nickels and four pennies will be given in change.

Figure 11:
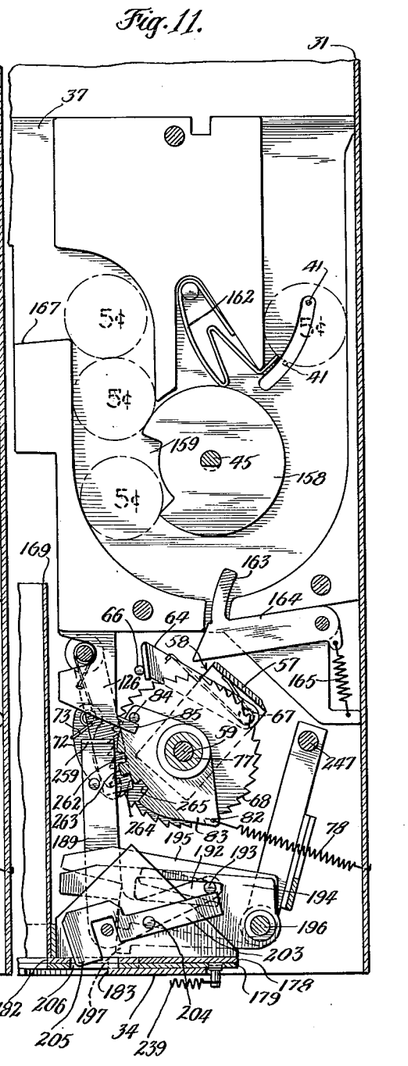

The mechanism by which the nickel change shuttles 178 and 179 are actuated includes a bell-crank lever 189 whose lower arm 192 carries a pin 193 at its outer end which controls the positions of shuttle actuating plates 194 and 195 by riding in rectangular slots formed in these plates. The plates are pivotally mounted at 196, and carry lugs 197 at their forward lower ends for entry into notches in the nickel shuttle plates 178 and 179. The shaft 196 is reciprocated after every sale, except when the final coin inserted is a penny to complete the sale, and this shaft carries with it in this reciprocation plates 194 and 195, and causes change-making shuttle movement of plate 179 or of both plates 179 and 178, or neither of these plates, depending upon whether lugs 197 on plates 194 and 195 are entered into complemental notches in shuttle plates 179 and 178.

Figure 20:
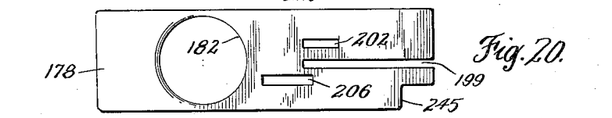
Figures 20 through 25 are detail plan views of the individual change-making shuttle plates.
Figure 21:
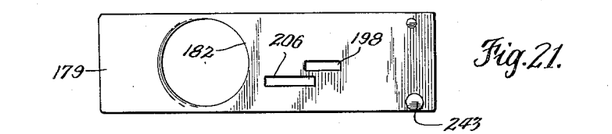
Figure 22:
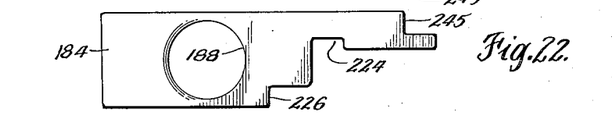
Figure 23:
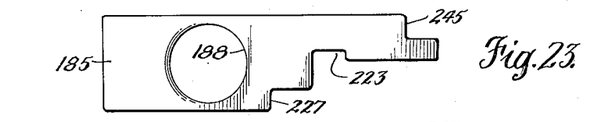
Figure 24:
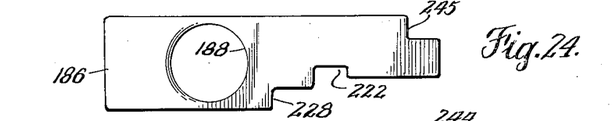
Figure 25:
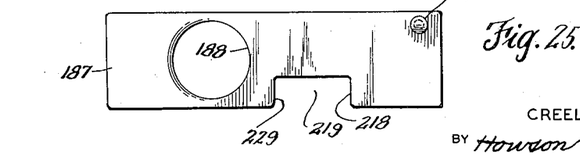

By reference to Figures 20 and 21, it will be seen that notch 198 in plate 179 underlies a slot 199 in the overlying plate 178. Thus, the lug 197 on the lower actuating plate 194 may enter notch 198 and be pulled outwardly with shaft 196 to give a nickel in change, without simultaneously actuating plate 178 to give a second nickel, when pin 193 is dropped to an intermediate position below that illustrated in Figure 11. If the pin is dropped still lower, however, the lug 197 on plate 195 enters notch 202 in shuttle plate 178, so that both shuttle plates are actuated simultaneously to give two nickels in change.

A safety latch plate 203 (Figure 11) is mounted for pivotal movement upon a pin 204, and has its mass distributed so that its forward end tends to drop downwardly and enter a lug or projection 205 within a pair of superimposed slots 206 in nickel shuttle plates 178 and 179. The forward end of plate 203 underlies pin 193, and when this pin is in its uppermost position, lug 205 will enter both of slots 206 in plates 178 and 179 to prevent movement of either of these plates to change-making position. When the bell-crank lever rotates to a position to lower lug 197 into slot 198, the lowering of pin 193 will depress the underlying end of latch plate 203 to raise lug 205 sufficiently to unblock shuttle plate 179 for outward movement by lug 197 to give a single nickel in change. When pin 193 is further lowered with bell-crank arm 192, lug 205 will be raised to clear slots 206 in both of plates 178 and 179, and to permit both of shuttle plates 178 and 179 to be moved outwardly by the lugs 197 of their actuating plates 194 and 195 to give two nickels in change.

The penny shuttle-actuating plates and latch plate operate on the same principle as discussed above for the corresponding nickel control. As illustrated in Figures 1, 6, 7, 16, 22–25 and 26, a plurality of progressively lower shuttle-actuating plates 207–210 are pivotally mounted on shaft 196, and are angularly staggered by the abutment of the upper edges of their rectangular slots 214 against pin 215 on bell-crank lever 216. The position of this bell-crank lever determines whether the lugs 217 on one or more of the actuating plates will enter the notch in the corresponding underlying shuttle plate 184–187 to move it to change-making position. The lowermost actuator 207 is on the extreme right in Figure 16, and in the uppermost position of bell-crank pin 215, the lugs 217 of this and all the other actuators 208–210 will clear the underlying slots or notches in shuttle plates 184–7, with the consequence that no change will be given upon reciprocation of shaft 196 carrying these shuttle actuator plates. In the next lower position of pin 215, however, the lug 217 of actuator 207 will abut the rear end 218 (Figure 25) of notch 219 of lower-most penny shuttle plate 187 to give one penny in change, and as pin 215 is further lowered, the lugs 217 of actuators 208, 209 and 210 are progressively

11 lowered into positions in which they operate against the rear ends of notches 222, 223 and 224, respectively of shuttle plates 186, 185 and 184 to give two, three or four pennies in change depending upon the position of pin 215. Figures 1 and 6 show actuators 207–10 in raised positions where their lugs pass through the open spaces of the penny shuttle plate assembly to give no change, while Figure 26 shows all four lowered and actuated to give four pennies in change.

A safety latch plate 225 (Figure 6) is controlled by pin 215 so that its forward end abuts shouldered edges 226, 227, 228 and 229 of shuttle plates 184–7 in the uppermost position of pin 215, and progressively releases these plates from the bottom toward the top as pin 215 is lowered, to permit delivery of one, two, three or four pennies in change.

Since operation as discussed above involves giving only of a single dime in change, only a single actuating plate 232 (Figure 12) is required for actuation of the dime shuttle plate 175, and the lug 233 on this actuating plate enters a notch 234 to effect the desired actuation through the reciprocation of the shuttle actuating plate carriage. The angular position of plate 232 and lug 233 is determined by pin 235 on arm 236 of a bell-crank lever 128, through slot 237 in plate 232, in a manner similar to control of the nickel and penny change actuator plates.

Springs 238, 239 and 242 (Figures 1, 6, 11, 12 and 19) serve to retract the dime shuttle and the lowermost penny and nickel shuttles, after actuation to give change, and pins 243 and 244 on the lowermost nickel and penny shuttle plates 179 and 187 (Figures 19–25) act against shoulders 245 on the overlying shuttle plates 178, 186, 185 and 184 to retract them also, in case they have been actuated in the same operation to deliver change.

In the operation of determining whether to give change, and the amount of such change, the positions of the bell-crank levers 128, 189 and 216 in controlling this function will be determined by the amount by which the value of the coins inserted exceeds the sale price, and these features of control will be explained later. As discussed above, however, the shuttle actuating plates will be reciprocated at the conclusion of each sale in which a nickel, dime or quarter is the last coin inserted, and this reciprocation will cause operation of the shuttle plates through the associated actuator plate mechanism if and when the levers 128, 189 and 216 are in the positions discussed above to permit such change making.

The reciprocation of the shaft 196 and actuator plate assembly to give change as required occurs through the operation of shaft 45 (Figures 7 and 26) through the additional revolution which it performs after lever 95 has been tripped to consummate the sale.

The reciprocation of the shuttle actuating plates 207, 194, 232, etc. is obtained through operation of a lever 246 (Figures 7 and 26) which is mounted to pivot about pins 247 and also pivotally secured at its lower end to shaft 196 carrying the shuttle actuating plates. This lever carries at its upper end an actuating bar 248, and this bar is pivotally secured to the lever at 249 and biased by spring 252 for counterclockwise rotation about this mounting. This counterclockwise rotation is, however, limited by abutment of an under side portion 253 of lever 248 against a shoulder 254 on lever 246, so that the counterclockwise rotation can occur only to the relative positions of Figure 26. A tab 255 (Figure 7) is carried at the lower end of bar 248 for control by the upper end 256 of cam 86 and a tab 257 at the upper end is actuated by cam 112 to operate lever 246 and cause reciprocation of the shuttle actuator carriage.

The lever 246 is normally urged in a clockwise direction as illustrated in Figure 6 by spring 258, and in its normal position tab 255 rests against surface 256 of cam

12

86, under the tension of spring 252. During the rotation of shaft 45 and cam 112 up to and including the rotation to complete the sale price, cam 86 will remain stationary, and the relative positions of the parts will enable cam 112 to miss tab 257 on arm 248, as illustrated in Figure 7. As described in connection with the first quarter completion of the sale, however, cam 86 will be rotated through a small clockwise arc in completion of the operation to vend, when the last coin has been inserted. This movement of surface 256 clockwise from the position of Figure 7 permits tab 255 and arm 248 to move under pressure from spring 252 in a small counterclockwise arc until surface 253 rests against shoulder 254. This throws tab 257 into the path of rotation of cam 112, which impels lever 246 in a counterclockwise direction about axis 247, and moves the shuttle actuator plates with their mounting shaft 196 outwardly from the position of Figures 6 and 7 to the position of Figure 26, to give change as required, through the controls now to be described.

We have already noted that a disc 83 (Figure 13) is mounted for rotation with sleeve 77 and serves as an anchor at 82 for one end of spring 78, which normally holds sleeve 77 in its extreme counterclockwise position with pin 84 abutting lug 85. We have also noted that pin 74 on ratchet 68, in displacing pin 75 secured to disc 76 on sleeve 77, causes rotation of sleeve 77. When the amount inserted is just sufficient to consummate the sale, the resulting clockwise rotation of sleeve 77 and the discs which it carries will be the equivalent of one tooth of ratchet 68, and if the final coin inserted to consummate the sale be larger than required, an increment of one ratchet tooth of rotation will be imparted for each five cents of the excess. This follows from the fact that rotation of ratchet 68 is strictly proportional to the coins inserted, and that in this particular apparatus the ratio is one ratchet tooth per nickel. Thus, the disc 83 is given a clockwise rotation corresponding to one ratchet tooth upon completion of the sale and one additional ratchet tooth for each five cents of value by which the coins inserted exceed the purchase price.

Let us now see the manner in which this additional rotation of disc 83 is utilized in the giving of nickels in change. As illustrated best in Figure 11, bell-crank lever 189 is provided with a tab 259, and this tab is adapted to abut the circumference of disc 83 or enter into a selected notch in that disc, when lever 189 is released by lever 126 for rotation in a clockwise direction, as discussed above. Tab 259 is normally aligned with the circumference of disc 83, but a notch 262 is formed in the disc at a location corresponding to two teeth of ratchet 68 behind this location in a counterclockwise direction. A raised portion 263 is located behind notch 262, a shoulder 264 of the same depth as notch 262 is located one ratchet tooth behind raised portion 263, and a notch 265 of double the depth of notch 262 and shoulder 264 is located one ratchet tooth behind shoulder 264.

In the sale discussed above in which the price was set for fifty cents, the insertion of two quarters merely moved pin 75 and disc 83 in a clockwise direction the distance of one ratchet tooth in displacing pin 75. Therefore, when lever 189 carrying tab 259 made its clockwise feeler movement, it encountered a continuous portion of the circumference of disc 83 in advance of notch 262, and lever 189 was therefore prevented from moving into a position in which lug 197 would have entered slot 198. On the ensuing movement of the shuttle carriage therefore, no nickel was given in change.

Assuming now that the same two quarters are inserted with the sale price set for forty-five cents instead of fifty, disc 83 will be moved two ratchet teeth, with the consequence that tab 259 will enter notch 262, and allow the lug 197 of shuttle actuator 194 to drop into slot 198 (Figure 21) of shuttle plate 179. This shuttle plate will accordingly be moved outwardly with the shuttle carriage to give one nickel in change.

If the price be set for forty cents in the same two quarter actuation, the tab will strike raised portion 263 in its inward movement, so that no nickel is given in change, but a dime will be given in change as discussed hereinafter.

If the price be set for thirty-five cents and two quarters inserted, the feeler movement of bell-crank 189 will cause tab 259 to encounter shoulder 264, while at the same time the dime change control to be later described will effect a corresponding operation, so that one dime and one nickel will be given in change. If, on the other hand, the price be set for thirty cents, the same dime control will be effective, while tab 259 enters the deep notch 265 to give two nickels in change. Thus, the apparatus will operate to give no change, a nickel, a dime, a dime and a nickel or a dime and two nickels, depending upon the amount by which pin 75 and sleeve 77 move from the original position, and this in turn is controlled by the excess of money inserted above the sale price for which the apparatus is set.

The nickel change-controlling disc 83 is shown cut away at 266 in Figure 12 to reveal the functioning of the underlying disc 76 used to control the giving of dimes in change. This disc 76 has a peripheral notch 267 having a circumferential extent equivalent to three ratchet teeth, and the tab 129 which underlies holding pawl 72 to later release this pawl as discussed above, operates in conjunction with this slot to allow bell-crank lever 128 to rotate clockwise to allow lug 233 to enter notch 234 to give one dime in change, every time pin 74 displaces pin 75 by three, four or five ratchet teeth; i.e., every time the amount inserted exceeds the sale price by ten, fifteen or twenty cents. In case the excess is fifteen cents, one nickel will be given in change at the same time, and in case it is twenty cents, two nickels will be so given, as described above. By consideration of various settings of the apparatus, it will be evident that the correct change in dimes and/or nickels will be given for any combination of coins inserted, and the same comment applies to penny change control, which will be described after we have described the manner in which pennies function in consummating a sale.

The operation of pennies in effecting a sale is obtained through a retaining spring 272 (Figure 6), rotor 273, and arm 274 of lever 275, which operates to register the effect of pennies impelled by notch 276 of the penny rotor upon arm 274. By reference to Figure 16, it will be seen that penny plate 35 and rotor 273 lie forwardly of the bar 57 and arm 60 through which levers 52, 154 and 164 act to register upon ratchet 68 the value of quarters, dimes and nickels processed through the apparatus, and that the lower edge of lever 275 does not therefore strike arm 57. It strikes instead a tab 277 on a lever 278 which carries a pawl 279 in operating relation to a ratchet disc 282 which is normally held in its extreme counterclockwise position by spring 283. When the underside of lever 275 operates against tab 277 to displace it in opposition to spring 280 in response to penny actuation, this causes pawl 279 to rotate penny ratchet wheel 282 through the distance of one tooth, and the ratchet is held in this position by holding pawl 284 pending further actuation.

Assuming that the apparatus is set to vend for five cents, the holding pawl 284 will ride up on bevelled surface 285 upon insertion of the fifth coin, allowing latch 286 to drop behind shoulder 287 on the holding pawl and hold it in off position, as pawl 279 is retracted to the inactive position illustrated in Figure 1. This allows spring 283 to return ratchet disc 282 in a counter-clockwise direction until shoulder 288 on disc 282 strikes tab 289 on latch 286 to release the holding pawl 284, and the apparatus is then ready for repetition of this penny actuating cycle.

With the apparatus set to vend for five cents or some multiple thereof, the ratchet disc 282 operates, upon insertion of the fifth penny, to effect a movement of the arm 60 carrying actuating bar 57 to cause pawl 64 to advance the principle ratchet wheel 68 through one ratchet tooth, thereby producing the same effect as though a nickel had been inserted instead of the five pennies. This result is produced through an underlying disc 292 (Figures 1 and 5), which is secured to ratchet disc 282 in a desired position of adjustment through a spring-pressed pin 293 which enters one of the five holes 294 in disc 282 to lock these discs for rotation together, in vending for a selected sale price. In vending for five cents or a multiple thereof, pin 293 will be entered in the hole 294 at the right end of the series of holes in Figure 1, and not in the left end hole as illustrated.

Figure 5:
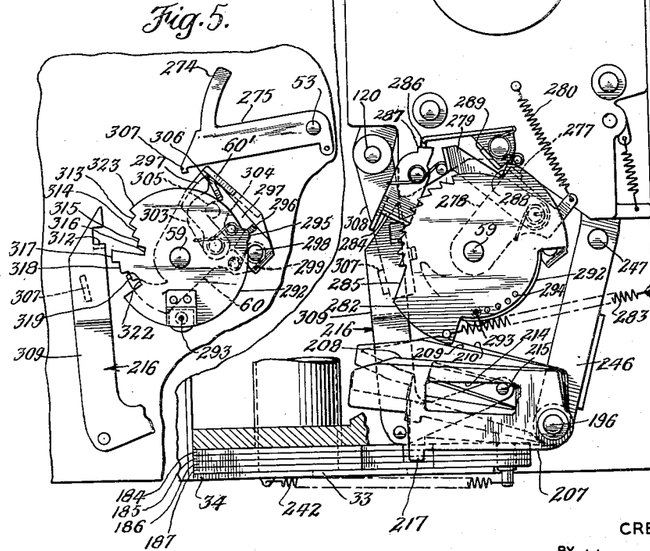
Figure 5 is a detailed face view of the rocker and latch mechanism controlling the giving of pennies in change.
Figure 27:
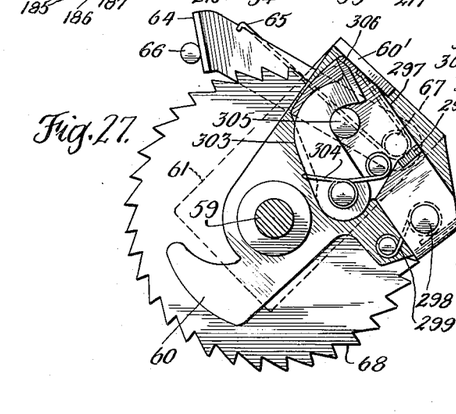
Figure 27 is an enlarged fragmentary view of the primary rachet wheel and associated rocker actuating mechanism.

With the setting described, as pawl 279 advances ratchet 282 through the first four notches in response to penny actuation, a cam projection 295 on the circumference of disc 292 moves into the position illustrated in Figure 5, beneath a tab 296 on a control lever 297. Lever 297 is pivotally mounted at 298 on depending arm 60 of the U-shaped actuating lever 58 by which ratchet 68 is advanced in response to coins of higher denomination, and is urged by spring 299 for counterclockwise rotation about this pivotal mounting. An actuating arm 303 is also carried by lever 297, and is maintained by spring 304 in yielding clockwise engagement with a pin 305 on the lever. A transversely extending bar 306 projects from the upper end of actuating arm 303 as illustrated in Figure 5. In the normal positions of the parts, bar 306 and lever 297 will be below the position illustrated in Figure 5, but when tab 296 rides up on projection 295 to the position illustrated in Figure 5, this throws control lever 297 and bar 306 into the position illustrated, with the result that, when the next or fifth penny is inserted, this will cause the rear edge of projection 307 on the underside of lever 275 to catch against the forward edge of bar 306 in its counterclockwise rotation to cause rotation of arm 60 and bracket 57 clockwise about axis 59. By reference to Figure 5 and especially to Figures 27 and 28, it will be seen that bar 306 underlies an overhanging ledge 60' which projects a slight distance laterally from arm 60 of lever 58. The movement of bar 306 therefore causes rotation in a clockwise direction of lever 58 with its actuating bar 57, and advances ratchet 68 one tooth. At the end of this movement, ratchet 282 is restored to its original position as discussed above.

In case it is desired to set the apparatus for an odd cent sale, pin 293 will be entered in one of the first four holes 294 to the left of Figure 1, the left end hole being employed as illustrated for a sale involving one odd penny, as six cents, eleven cents, twenty-one cents, etc., and the next three being for two, three and four odd pennies, as illustrated. In the case of a twenty-one cent sale, for example, pin 293 is entered in the left hole 294, as illustrated in Figure 1, while pin 145 of spring 143 is entered in the fifth hole from the right of disc 141, as illustrated in Figure 2. The adjustment of pin 293 to the position illustrated rotates projection 295 to the position in which it underlies tab 296 at the very start of the operation. The very first penny inserted will therefore actuate bar 306 and advance ratchet 68 through one tooth; i.e., it will have the same effect in advancing this ratchet to actuating position as would the insertion of a nickel. If three more pennies are now inserted, they will not advance ratchet 68, but they will advance ratchet disc 282 to a position in which holding pawl 284 occupies the ratchet space adjacent bevelled surface 285, and on the next actuation pawl 284 will ride up this surface and return to the initial position illustrated in Figure 1. Since tab 296 overlies projection 295 in this position, insertion of the sixth penny will again advance nickel ratchet 68 the space of one tooth, and every fifth penny thereafter inserted will cause similar actuation.

If the sale is for twenty-three cents instead of twenty-one cents, the operation will be the same as discussed above, except that pin 293 will be entered into the third hole 294 from the left of Figure 1, and tab 296 will ride up on projection 295 upon insertion of the second, seventh, twelfth, etc. pennies, with the result that the nickel master ratchet 68 is advanced one tooth upon insertion of the third, eighth, thirteenth, etc. pennies. Thus, in this case, the sale will be completed by insertion of twenty-three pennies, eighteen pennies and a nickel, thirteen pennies and two nickels or a dime, eight pennies and three nickels or a dime and a nickel, or three pennies and four nickels or a dime and two nickels. It will also be completed by insertion of a quarter, of two dimes and a nickel, or of five nickels, and in any of these cases two pennies will be given in change, through control exercised upon bell-crank lever 216 through disc 292, as discussed below.

In the twenty-three cent sale used for purposes of illustration, if three cents be inserted and a quarter inserted thereafter, it will be seen that ratchet 68 will be advanced the distance of six ratchet teeth instead of five, with the consequence that tab 259 (Figure 11) will enter notch 262 in the ensuing feeler movement of bell-crank 189, and the apparatus will deliver a nickel in change. The foregoing comments regarding specific sales settings and insertion of specific coins may be generalized in regard to insertion of any combination up to the maximum for which the machine is designed. Thus, in the illustrative embodiment, any combination of quarters, dimes, nickels and pennies may be inserted to complete sales from one cent through a dollar and thirty cents, and if the amount inserted exceeds the sale price, exact change will be given in dimes and/or nickels and/or pennies, as indicated.

The control of the positions of the penny shuttle actuating plates 207–10 (Figures 1, 6 and 16) to determine whether four, three, two, one or zero pennies are to be returned in the ensuing shuttle carriage actuation, is obtained through bell-crank lever 216 and disc 292 (Figure 5) through the features now to be described. The upwardly projecting arm 309 of bell-crank 216 carries a tab 307 which normally abuts the rear edge of a lever 308 (Figure 1) secured to shaft 120. Bell-crank 216 and the penny-actuating plates 207–210 are therefore normally held in the inactive positions illustrated in Figures 1 and 5. As noted above, however, a part of the vending and resetting operation which follows completion of a sale involves counterclockwise rotation of shaft 120 upon release by latching lever 118. The resulting counterclockwise movement of lever 308 permits tab 307 and bell-crank lever 216 to move in a clockwise direction under the force of gravity acting through actuators 207–10 on pin 215, and this movement is used as a feeler action to determine the penny change making operation, upon the ensuing outward movement of the shuttle carriage with actuator plates 207–10, as discussed above.

On the forward edge of the upwardly extending arm 309 of bell-crank lever 216, there is provided a laterally extending tab 312 which either abuts a portion of the circumference of disc 292 or enters a selected notch or shoulder on that disc, thereby determining the extent of the clockwise movement of lever 216 and hence the positions of lugs 217 on actuators 207–210 in entering one or more of the notches 219, 222, 223 and 224 (Figures 22–25) to cause the shuttle apparatus to give pennies in change.

In order to obtain this desired control of penny change making in the aforesaid feeler movements of lever 216, disc 292 is provided with a series of notches and shoulders, as illustrated in Figure 5. The first shoulder 313 at the top left has a depth sufficient, when located in the line of clockwise rotation of tab 312 with lever 216, to permit that lever to rotate a distance sufficient to permit lug 217 on the bottom-most actuator 207 to enter the notch 219 to actuate the lowest penny shuttle plate 187 to give one penny in change. The next three shoulders and notches 314, 315 and 316 are progressively deeper and permit the tab 312 to move inwardly sufficiently to permit lugs 217 on actuators 208, 209 and 210 to enter notches 222, 223 and 224 (Figures 22–24), if the tab 312 moves into notch 316, or to enter notches 222 and 223 if it moves against shoulder 315, or to enter notch 222 only if it moves against shoulder 314. Thus, lever 216 will be rotated to a position to give no pennies, one penny, two pennies, three pennies, or four pennies in change, depending upon whether the feeler movement of tab 312 brings it into contact with the peripheral surface 323 in advance of the shoulders and notches, onto shoulder 313, 314 or 315, or into notch 316, respectively.

A portion of the disc circumference of full radial height is provided behind notch 316 at 317, and this is followed by shoulders 318 and 319 and notch 322, of progressively increasing depth. From the foregoing discussion it will be evident that no pennies will be given in change if the inward feeler movement of tab 312 brings it into abutment with surface 317, but that one, two or three pennies will be given if it enters shoulder 318 or 319, or notch 322, respectively.

The portions 323, and 313—322 of disc 292 are spaced progressively around the circumference of that disc a distance of one ratchet tooth of ratchet 282 for each such succeeding surface. With this explanation, it will now be possible for us to follow the adjustments and operations involved in the penny change making actuation.

Let us assume first the situation illustrated in Figures 2 and 5, to wit, that pins 145 and 293 on discs 141 and 292 are set in the fifth hole 142 from the right of disc 141 and the last hole 294 on the left of disc 282, respectively. As noted above, this is the setting for a twenty-one cent sale, and it locates the four cent change notch 316 in the direct line of inward swinging of tab 312 in its feeler movement. Therefore, if a quarter be inserted to effect the twenty-one cent sale, the inward swinging of tab 312 with its lever 216 reaches its greatest depth, with tab 312 entered in notch 316, and the lugs 217 on all four of actuators 207–10 drop into their respective notches 219—224 in shuttle plates 187—184, respectively, with the consequence that all four shuttle plates are moved to give four cents in change, when lever 246 is oscillated to carry shaft 196 with the shuttle assembly into change making position.

If, with the parts in this position of adjustment, the first or a subsequent coin be a penny, this will move ratchet wheel 282 through one notch, bringing the peripheral surface 317 opposite tab 312, while at the same time it advances the nickel master ratchet 68 through one notch. If the first coin be a penny and the next a quarter, a nickel will be given in change, since ratchet 68 will be moved a total of six teeth, bringing notch 262 into position in which feeler tab 259 (Figure 11) enters it and allows bell-crank lever 189 to rotate into position in which one nickel is returned. However, no penny will be returned, since tab 312 will abut surface 317 in its feeler movement, thereby preventing rotation of bell-crank lever 216 into position in which any of lugs 217 are allowed to drop into driving engagement with their associated penny change-making shuttle plates. The penny actuator plates will accordingly be held upwardly out of this lug-driving relation during the ensuing movement of lever 246 and actuators 207–210.

If, after first inserting a penny, four nickels, two dimes, or a dime and two nickels are inserted to complete the twenty-one cent sale, no change will be given, for ratchet 68 will only be moved a total of five notches, and each of feeler 259 (Figure 11), 129 (Figure 13) and 312 (Figure 5) will contact a portion of the circumference of its associated control disc in its feeler movement and be prevented from moving to any coin-returning position.

As noted above, to set the penny change-controlling disc to vend for an even nickel or any multiple thereof, disc 292 will be indexed four positions counterclockwise with respect to ratchet disc 282, so that pin 293 is entered into hole 294 at the extreme right of Figure 1. This aligns tab 312 with surface 323 (Figure 5), so that no pennies will be given in change if the purchase price is inserted in nickels and/or dimes and/or quarters only. However, if part or all of the purchase price is paid in pennies, the first four pennies, in indexing ratchet disc 282, will move disc 292 successively through positions in which tab 312 is aligned wtih shoulders and notches 313–316, respectively. If the sale price is set at twenty-five cents, for example, and the purchaser inserts three pennies and then discovers he has no more, he may now insert twenty-five cents in dimes and nickels, or a quarter, and three pennies will be returned to him, since tab 312 will enter the three cent change shoulder 315 as bending is accomplished.

Again assuming a twenty-five cent sale price, upon the insertion of each of the fifth, tenth, fifteenth, etc. penny, the nickel master ratchet 68 will be advanced one notch, and both of discs 282 and 292 will be restored to their initial positions, with tab 312 aligned with the no-penny-change-making circumferential surface 323.

We have seen that, if pennies are inserted in error in making a sale for five cents or a multiple thereof, the proper amount will be returned to the purchaser, upon insertion of higher coins to complete the sale. The same comment applies to odd cent sales. For example, with the twenty-one cent sale setting discussed above, disc 292 is indexed by the first penny into position where tab 312 is aligned with surface 317, and upon insertion of the next three pennies it will be indexed to positions where this tab is aligned with shoulders 318 and 319, and notch 322, successively. Upon insertion of the fifth penny, discs 282 and 292 will be returned so that tab 312 is again aligned with notch 316, and the sequence will be repeated indefinitely as more pennies are inserted, until the sale price is reached. However, if after inserting two, three, four or five pennies, or seven, eight, nine or ten pennies, the purchaser finds he has no more pennies, he will obtain return of the erroneously inserted pennies, if he thereafter inserts higher coins in sufficient amount. For example, after eight pennies have been inserted, the nickel master ratchet 68 will have been advanced two teeth, and tab 312 will be opposite shoulder 319. If the operator now inserts a quarter, this will advance the master ratchet five additional teeth, with the result that the dime return feeler tab 129 (Figure 12) will enter notch 267 to give one dime in change, while tab 312 enters shoulder 319 to give two pennies in change. Thus, with thirty-three cents inserted for a twenty-one cent sale, exactly the required twelve cents are returned.

The foregoing statements regarding return of erroneously inserted pennies apply to dimes and nickels as well. For example, if pin 293 be set in the extreme right hole 294 (Figure 1) and pin 145 set in the third hole 142 from the right top (Figure 2) so as to vend for fifteen cents, it will require movement of three notches of master ratchet 68 to effect vending. If movement is obtained through the first two of these notches by insertion of a dime and a quarter be then inserted, this will result in total indexing of ratchet 68 through seven notches. Since tab 259 (Figure 11) will thus be aligned with the deep nickel return slot 265 and tab 129 (Figure 12) with dime return slot 267, two nickels and a dime will be given in change.

In the operations discussed above, in which a coin other than a penny is the last coin inserted to complete the sale, we have noted that the lever 246 is actuated by cam 112 and bar 248 to move the change-making shuttle mechanism every time a sale is completed, and to give change if the tab positions of any of the feeler bellcranks so indicates. In the case where the last coin to complete the sale is a penny, however, this actuation will not occur, since the leading edge of cam 112 will have passed the position of tab 257 by the time the penny has operated through arm 274 to complete the sale. However, the failure of the shuttle to operate in this case is immaterial, since there is obviously no change to be given in any case where the final coin which completes the sale is a penny.

While the invention has been described only in relation to a single specific embodiment, persons skilled in the art will be aware that it may be modified or refined in various ways without departing from its generic spirit. I therefore wish to have it understood that this invention is not to be limited in interpretation except by the scope of the following claims.

I claim:

1. In a coin-controlled apparatus, the combination comprising means for receiving and directing coins through a controlled path, means for detecting the presence of a coin in said path, means for positively impelling said coin through at least a part of said path, an electric motor for driving said impelling means through a single revolution, means responsive to detection of a coin by said detecting means for energizing said motor, means responsive to cumulative passage through said apparatus of a plurality of coins whose total value equals the vending price for energizing an associated vending apparatus, means responsive to the operation of said last-named means for operating said impelling means through an additional revolution, and means responsive to said operation through said additional revolution for resetting said cumulative passage-responsive means to its initial condition.

2. A coin-controlled apparatus as defined in claim 1, in which said means for energizing said vending apparatus includes a switch arm in circuit-controlling relationship to an electric motor for performing a vending operation and in which actuation of said switch arm controls means to maintain energization of the motor circuit of said first-mentioned electric motor to drive said impelling means through said additional revolution.

3. A coin-controlled apparatus as defined in claim 2, in which the means for detecting the presence of a coin is a pivotally mounted switch arm, and in which the means for positively impelling the coin through its path is a rotor provided with a notch to receive the coin, and in which said means to maintain energization includes a latching arm provided to hold said last-mentioned switch arm in operative position during the impelling movement of said coin by said rotor.

4. In a coin-controlled apparatus, the combination comprising means for receiving and directing coins through the apparatus, means cumulatively driven by successive movement of a plurality of coins through the apparatus for controlling an associated vending apparatus, change-making means comprising a plurality of shuttle plates in coin receiving relationship to coin change-holding barrels and means for driving said shuttle plates, means responsive to movement of said cumulatively driven means to a predetermined vending position for reciprocating the means for driving said shuttle plates, and means responsive to movement of said cumulatively driven means beyond said predetermined position for controlling the number of shuttle plates driven by said last-mentioned means in said reciprocation.

5. A coin-controlled apparatus as defined in claim 4, in which said last-mentioned means comprises feeler mechanism movable against a notched surface of said apparatus whose position is controlled by the excess of the amount inserted over the vending price.

6. A coin-controlled apparatus as defined in claim 5, in which said last-mentioned means includes a plurality of driving bars each selectively engageable with a shuttle plate in response to said feeler control.

7. In a coin-controlled apparatus, the combination comprising a plurality of substantially parallel plates having slots providing separate paths for directing coins of different denominations through the apparatus, a feeler arm yieldably mounted in said separate paths for detecting the presence of coins in said paths, a plurality of rotors mounted in impelling relationship to said separate paths and each provided with means for receiving a coin deposited in one of said paths, means for driving all of said rotors simultaneously and thereby impelling through parts of said respective paths extending downwardly and then upwardly coins deposited in said paths, means responsive to said detecting means for starting the operation of said driving means, means responsive to the additive impelling effect of said coins downwardly and upwardly through said separate paths as aforesaid to impart to a collectively operable control member an actuating movement, means responsive to completion of said actuating movement to operate vending apparatus to effect a sale when coins having total value at least equal to a predetermined and pre-set sales price have been inserted, means for adjusting the extent of said actuating movement required to operate said vending apparatus, means for causing said rotors to rotate through an additional revolution upon completion of said actuating movement, means actuated by said additional revolution of said rotors for restoring said control member to its pre-set condition, a plurality of vertically extending coin change barrels forming a part of said coin-controlled apparatus, a plurality of horizontal shuttle plates having holes aligned with the respective barrels to receive the lowermost coins therein, a plurality of vertically edgewise disposed shuttle-actuating plates each associated with one of said shuttle plates and having a lug adapted to drop into an associated notch therein, a plurality of discs having irregular peripheral surfaces mounted for rotation within said coin-controlled apparatus, means for rotating each of said discs through an arc from a fixed starting position proportionate to coins impelled through said coin-controlled apparatus by said rotor, plural feeler means movable against the surfaces of the respective discs, means responsive to the extent of said movement of said feeler means against said discs to control the vertical positions of said actuating plates, and means for imparting to said actuating plates as a group a reciprocating movement from an inactive position in which the lugs thereon are in alignment with the underlying notches in the associated shuttle plates, to and from a position in which said lugs impel to coin returning position shuttle plates coupled to said actuating plates by the dropping of certain of said lugs into certain of said notches in response to said feeler motion.

8. In a coin-controlled apparatus, the combination comprising means for presetting the apparatus to vend upon insertion of coins having a minimum aggregate value, means responsive to the total value of coins passed through the apparatus for effecting a vending operation when said value exceeds a pre-set sales price, a coin change barrel forming a part of the apparatus, a plurality of superimposed horizontally mounted shuttle plates forming an assembly having holes in said respective shuttle plates aligned with said coin change barrel at one end thereof and each adapted to receive a coin from the barrel adjacent said end thereof, means responsive to insertion of coins in excess of said minimum aggregate value for simultaneously operating selected shuttle plates in sufficient number from said assembly to return to a customer a desired number of coins in change, and means controlled by the excess value of said inserted coins above the sales price for controlling the selection of said shuttle plates for coin returning actuation.

9. A coin-controlled apparatus as defined in claim 8, including additionally a member controlling said selection controlling means, and means for imparting to said member a movement proportionate to the total value of coins inserted, in consummating the desired sale.

10. In a coin-controlled apparatus, the combination comprising means for directing coins of at least two different denominations through the apparatus through separate paths, separate pawls associated with said respective paths, means associated with each of the pawls for reciprocating the same in response to passage of each coin through its associated path and thereby rotating an associated ratchet a pre-established increment in response to each coin passed therethrough, means controlled by said ratchet associated with a path of coins of smaller denomination for registering an additive control function upon the ratchet associated with a path of coins of larger denomination, upon predetermined passage of coins through said path of said coins of smaller denomination, and means for imparting a return rotation to its starting position to said ratchet associated with the path of said coins of smaller denomination.

11. A coin-controlled apparatus as defined in claim 10, in which said means for registering an additive control function includes adjustment means for pre-selecting the particular coin in a sequence of coins of said smaller denomination by which said additive control function is registered upon the ratchet associated with said path of coins of larger denomination.

12. A coin-controlled apparatus as defined in claim 11, in which said means for imparting a reverse rotation to its starting position to said ratchet associated with the path of said coins of smaller denomination is set to operate in response to passage through said path of coins of smaller denomination having an aggregate value equal to a single coin of said larger denomination.

13. In a coin-controlled apparatus, the combination comprising a coin receiving and directing channel, a rotor having a notch adapted to receive a coin and drive it through at least a part of said channel, a pivotally mounted arm of thin resilient material having a reverse bend, a projection on the free end of said arm beyond said reverse bend projectible into said channel in coin-intercepting position for preventing a coin in said channel from reaching said rotor, the apex of said reverse bend being positioned to be received in said notch and release said projection from coin-intercepting position when the rotor is in its normal position of rest but to ride on the circumference of said rotor and thereby project said projection into coin-intercepting position during the major part of the rotation of said rotor.

14. In a coin-controlled apparatus as claimed in claim 13 and means normally biassing said arm to a position wherein said projection is released from coin-intercepting position upon positioning of said apex in said notch.

References Cited in the file of this patent

UNITED STATES PATENTS

| 502,242 | Travis | July 25, 1893 |
| 1,257,062 | Adams | Feb. 19, 1918 |
| 1,761,386 | Davis | June 3, 1930 |
| 1,858,190 | Frick | May 10, 1932 |
| 2,010,815 | Granzelius | Aug. 13, 1935 |
| 2,076,564 | Hoban | Apr. 13, 1937 |
| 2,081,193 | Breitenstein et al. | May 25, 1937 |
| 2,083,947 | Furber | June 15, 1937 |
| 2,236,198 | Osborne | Mar. 25, 1941 |
| 2,276,449 | Andres | Mar. 17, 1942 |
| 2,290,920 | Thatcher | July 28, 1942 |
| 2,354,896 | Weiler | Aug. 1, 1944 |
| 2,377,413 | Fry | June 5, 1945 |
| 2,433,689 | Fry | Dec. 30, 1947 |
| 2,538,358 | Farrell | Jan. 16, 1951 |

(Other references on following page)

UNITED STATES PATENTS

| | | | |
|---|---|---|---|
| 2,627,963 | Nelson | Feb. 10, | 1953 |
| 2,647,608 | Dahlberg et al. | Aug. 4, | 1953 |
| 2,655,243 | Hehn | Oct. 13, | 1953 |
| 2,669,336 | Hunsinger | Feb. 16, | 1954 |
| 2,679,917 | Andres | June 1, | 1954 |
| 2,728,434 | Fry | Dec. 27, | 1955 |
| 2,732,054 | Hehn | Jan. 24, | 1956 |
| 2,760,618 | Eason | Aug. 28, | 1956 |
| 2,780,337 | Fremon | Feb. 5, | 1957 |

FOREIGN PATENTS

| | | | |
|---|---|---|---|
| 375,264 | Great Britain | Dec. 24, | 1930 |
| 498,145 | Great Britain | Jan. 4, | 1939 |